United States Patent [19]
Matsumoto

[11] Patent Number: 5,729,722
[45] Date of Patent: Mar. 17, 1998

[54] SEMICONDUCTOR INTEGRATED CIRCUIT AND COMMUNICATION CONTROL APPARATUS

[75] Inventor: Manabu Matsumoto, Handa, Japan

[73] Assignee: Nippondenso Co., Ltd., Kariya, Japan

[21] Appl. No.: 592,533

[22] Filed: Jan. 26, 1996

[30] Foreign Application Priority Data

Jan. 27, 1995 [JP] Japan ................... 7-011643

[51] Int. Cl.⁶ ........................................ G06F 1/32
[52] U.S. Cl. ........................................ 395/560
[58] Field of Search ........................ 395/560, 750, 395/879, 185.08

[56] References Cited

U.S. PATENT DOCUMENTS

| | | | |
|---|---|---|---|
| 4,851,987 | 7/1989 | Day | 395/560 |
| 5,623,677 | 4/1997 | Townsley et al. | 395/750 |

FOREIGN PATENT DOCUMENTS

| | | |
|---|---|---|
| 2-12084 | 1/1990 | Japan. |
| 3-284052 | 12/1991 | Japan. |
| 4-164289 | 6/1992 | Japan. |
| 4-315282 | 11/1992 | Japan. |
| 4-318488 | 11/1992 | Japan. |
| 5-37378 | 2/1993 | Japan. |
| 7-84666 | 3/1995 | Japan. |

*Primary Examiner*—Thomas M. Heckler
*Attorney, Agent, or Firm*—Cushman, Darby & Cushman IP Group of Pillsbury Madison & Sutro LLP

[57] ABSTRACT

A semiconductor integrated circuit, which can precisely measure the sleep time of a CPU by using a built-in oscillation circuit which does not utilize an oscillator to automatically activate the CPU, is disclosed. A communication control part of a responder mounted on a vehicle, which composes a toll road charging system, is composed of an LSI having a built-in CPU with a sleep function for automatically stopping operation clocks. The CPU is held in the sleep state for a certain time period from the time when the responder completes data communications with a ground station until the time when the responder exits the communication area of the ground station. The sleep time is measured by having a dividing counter downcount oscillation signals from a CR oscillation circuit built in the LSI. However, as the oscillation frequency of the CR oscillation circuit varies according to the operational environment, such as temperature, the CPU obtains the frequency error of the second clock pulses and correct the count value for sleep time measurement based on the reference clock pulses from a quartz oscillator, which becomes the operation clocks of its own, immediately before entering the sleep state.

18 Claims, 6 Drawing Sheets

GROUND STATION (TOLL ROAD ENTRANCE/EXIT)

RESPONDER (MOUNTED ON VEHICLE)

SEMICONDUCTOR INTEGRATED CIRCUIT AND COMMUNICATION CONTROL APPARATUS

CROSS REFERENCE TO RELATED APPLICATION

This application is based upon and claims the benefit of priority of the prior Japanese Patent Application No. 7-11643 filed on Jan. 27, 1995, the contents of which are incorporated herein by reference.

BACKGROUND OF THE INVENTION

1. Field of the Invention

The present invention relates to semiconductor integrated circuits, and more particularly to a semiconductor integrated circuit built in a central processing unit (CPU) having a so-called sleep function for automatically stopping operation clock pulses upon the completion of a specified processing operation and entering the sleep state. The present invention also relates to communication control apparatuses comprising such semiconductor integrated circuits.

2. Related Arts

A charging system, which can automatically collect or receive a toll through wireless communications with responders mounted on vehicles passing through a tollgate of a toll motorway or the like, has been known.

Such a charging system has been constructed so that toll collection/reception can accurately be performed for each vehicle by setting a communication sequence with a plurality of vehicles as disclosed in the Japanese Unexamined Patent Publication No. 4-315282. That is, a ground station installed on the tollgate transmits an interrogatory number to a vehicle entering the communicable area of the ground station and suspends the allotment of an interrogatory number to the subsequent vehicle until the completion of communications for toll collection/reception with the responder that has previously received the interrogatory number.

However, such a conventional charging system has a problem when in traffic flow becomes congested around the tollgate. The responder may receive a plurality of signals from the ground station and is subjected to a plurality of toll collection/reception operations so that an excessive toll may be charged upon vehicles within the communicable area.

SUMMARY OF THE INVENTION

In view of the above, as a method of preventing duplicated charging, in the present invention, the operation of the CPU for use in toll collection/reception within the responder is stopped upon the completion of toll collection/reception to prevent the responder side from performing the operation of toll collection/reception during the time required for the vehicle to exit the communicable area. This can easily be realized by using a sleep function that causes the CPU to automatically stop the operation clock pulses.

However, when the CPU enters the sleep state as described above, it is necessary to activate the CPU after a specified time has elapsed to perform communications based on the signals from the ground station. For this purpose, it is necessary to provide a timer circuit which can monitor the sleep state.

For the timer circuit, a quartz or ceramic oscillator with a stable oscillation frequency, which is used also for the generation of operation clocks of the CPU, may be used to measure the length of the sleep state by counting the oscillation pulses (clocks) from the oscillator. However, the timer circuit using such oscillator cannot be built into the same chip with the CPU, which would make a large-sized apparatus. Further, the oscillator made of quartz or ceramic would make the apparatus expensive.

To counter these problems, a self-excitation type oscillation circuit (e.g., CR oscillation circuit composed of a capacity element, a resistance element, a semiconductor element, etc.) may be used to build the whole timer circuit into the same chip with the CPU so that the sleep time can be measured without using the expensive oscillator made of quartz or ceramic as described above.

However, such oscillation circuit is susceptive to the operation environment, such as temperature. Furthermore, due to variance in the capacity values, resistance values, etc. of the elements composing the oscillation circuit, there is variance among the individual integrated circuits, causing the sleep time of the CPU to be unstable. As a result, there is an apprehension that the duplicated charging may not perfectly be prevented by this charging system.

The present invention provides a semiconductor integrated circuit which can precisely measure the length of the sleep state of the CPU by using the oscillation circuit built into the same chip with the CPU chip and thereby reliably reactivate the CPU upon the elapse a specified length of sleep time.

In the semiconductor integrated circuit according to the present invention, includes a timer circuit which measures the length of the sleep state of the CPU and reactivates the CPU when the measured time reaches the specified sleep time with an oscillation circuit which is composed of a capacity element, a resistance element, a semiconductor element, etc. The timing circuit generates second clock pulses without using any quartz or ceramic oscillator and includes a sleep time determining means which determines the elapse of the sleep time by counting the second clock pulses from the oscillation circuit to reactivate the CPU. The whole timer circuit for activating the CPU is built into the CPU chip.

The oscillation frequency of the oscillation circuit of the above description varies due to variance in the operating conditions, such as temperature, and variance in the capacity value, resistance value, etc. of the elements composing the oscillation circuit and resultant variance among the individual elements. However, according to the present invention, a sleep time calibrating means is provided within the semiconductor integrated circuit. By using the sleep time calibrating means, an error with respect to the reference frequency of the second clock pulses generated by the built-in oscillation circuit is corrected based on the reference signals from the oscillator or externally inputted at a specified time interval before the CPU enters the sleep state (i.e., during the performance of the processing operation by the CPU) and the count value to be used for the determination of the sleep time by the sleep time determining means so that the sleep time can be a specified fixed time.

Hence, according to the present invention, the sleep time of the CPU having the sleep function can always be precisely monitored by the timer circuit built in the same chip with the CPU, and after a certain elapse of the sleep time, the CPU can immediately be activated.

As a result, there is no need to provide an addition timer circuit for precisely monitoring the sleep time as a separate electronic component in addition to the CPU, and the CPU having the sleep function and so-called wake-up function for automatic recovery from the sleep state can be constructed as a single chip component, and therefore, a low-cost timer circuit can be provided.

BRIEF DESCRIPTION OF THE DRAWINGS

These and other objects, features and characteristics of the present invention will be described in the following detailed description, the appended claims, and the drawings, all of which form a part of this application. In the drawings:

DETAILED DESCRIPTION OF THE PRESENTLY PREFERRED EXEMPLARY EMBODIMENTS

As a preferred embodiment of the present invention, an example will be described in which the present invention is applied to responders of a toll road charging system for charging vehicles. The toll road charging system is composed of ground stations provided at an entrance/exit of a toll road and the responders mounted on vehicles.

Figure 2A:
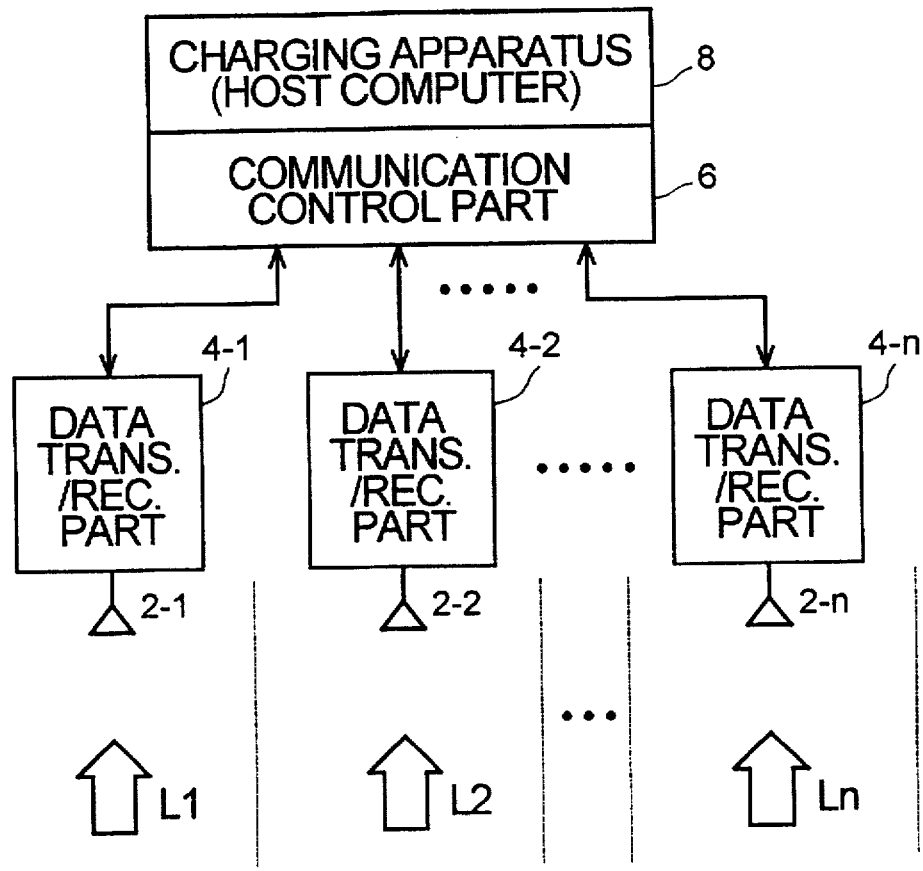
FIG. 2A is a block diagram illustrating the entire composition of a toll road charging system.

As illustrated in FIG. 2A, in the toll road charging system according to the present invention, ground stations are provided for a plurality of lanes L1, L2, . . . , Ln at an entrance/exit of the toll road. The toll road charging system is composed of a plurality of antennas 2-1, 2-2, . . . , 2-n for specified data communications related to the toll collection/ reception made between the respective responders mounted on the vehicles passing through the respectively corresponding lanes L1 through Ln. The lanes L1 through Ln collectively compose a communication area. The toll road charging system further includes a plurality of data transmitting/ receiving parts 4-1, 4-2, . . . , 4-n for making data communications with the respective responders through the respective antennas 2-1 through 2-n, and a communication control part 6 for enabling the respective data transmitting/ receiving parts 4-1 through 4-n to transmit pilot signals to the respective responders for the activation thereof and start the specified data communications for charging upon the receipt of response signals from the responders as a result of the transmission of the pilot signals. The communication control part 6 is connected to a charging unit (host computer) 8 for billing the toll based on the data obtained through communications with the responders.

Figure 2B:
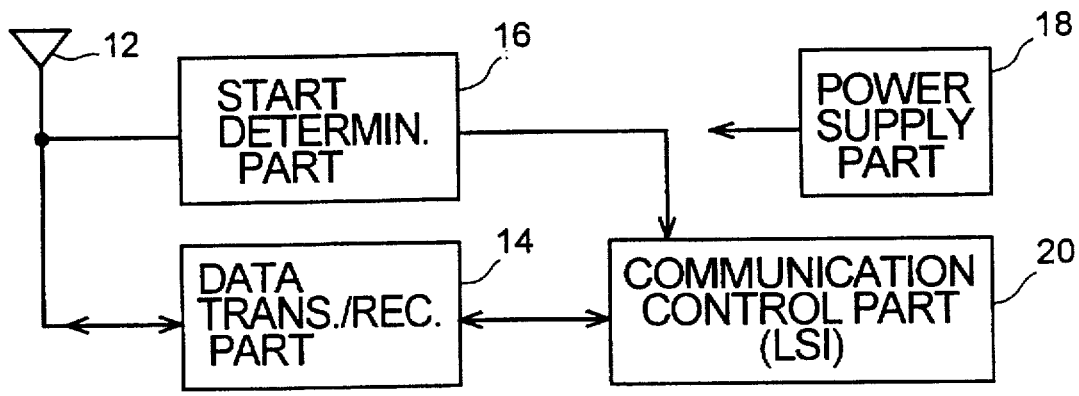
FIG. 2B is a block diagram illustrating the entire composition of a responder mounted on a vehicle.

As illustrated in FIG. 2B, each responder mounted on a vehicle is composed of an antenna 12 for communications, a data transmitting/receiving part 14 for making data communications with a ground station through the antenna 12, and a start determining part 16 for determining that the responder (i.e., the vehicle) has entered the communication area of any one of the data transmitting/receiving part 4-1 through 4-n on the ground station side. When pilot signals for activation transmitted from the ground station side through the antenna 12 are received and the levels of the pilot signals are at or above the required levels and then the tart determining part 16 commands the start of the data communications. Each responder also includes a communication control part 20 for enabling the data transmitting/ receiving part 14 to transmit response signals upon the receipt of the start signals from the start determining part 16 and then making data transmission/receipt for the toll collection/reception through the data transmitting/receiving part 14 with the data transmitting/receiving part 4 on the ground station side, and a power supply part 18 for generating a fixed power voltage VCC using a battery or cell mounted on the vehicle as a power source and then supplying power to each of the above-described components of the responder.

Figure 1:
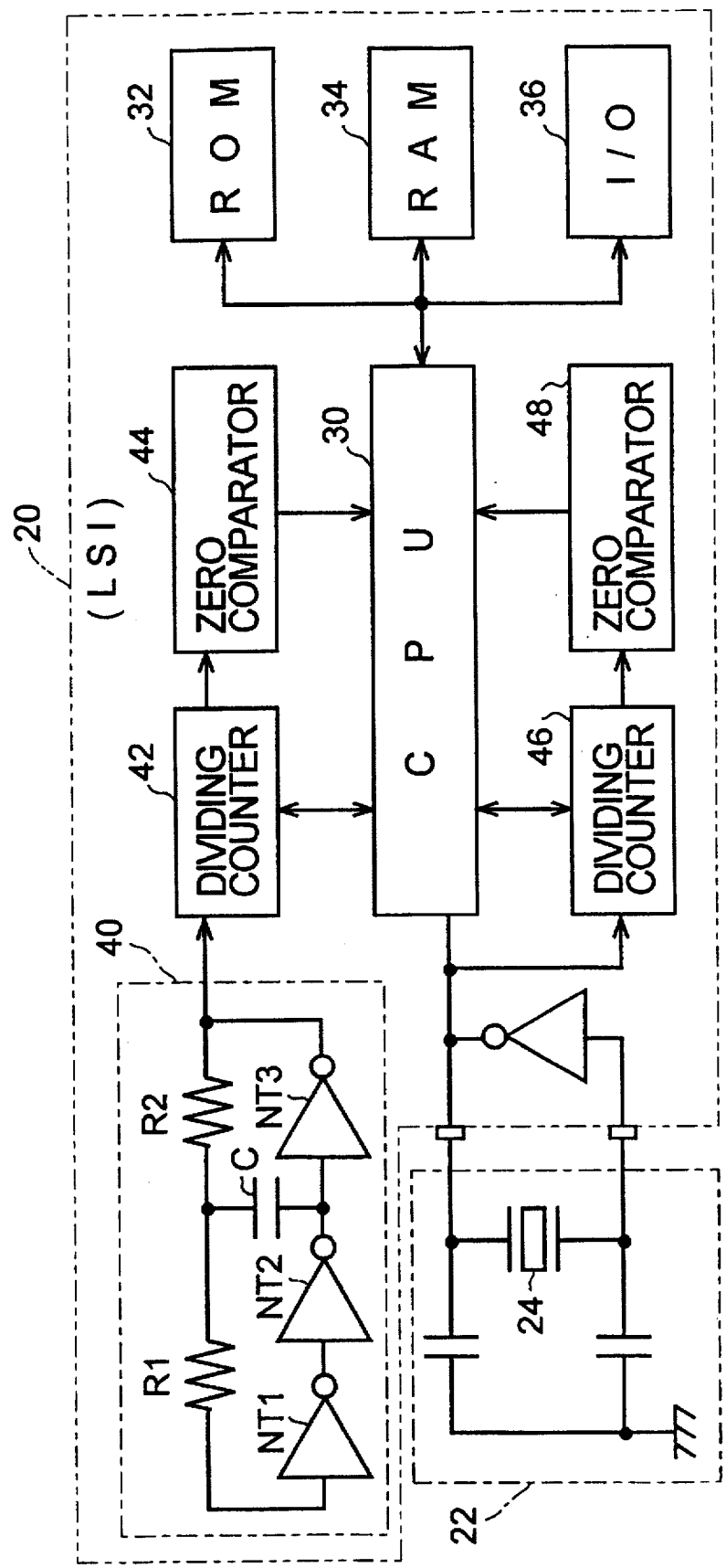
FIG. 1 is an electric circuit diagram illustrating the construction of a communication control part of an embodiment according to the present invention.

The communication control part 20 is a semiconductor integrated circuit according to the present invention, and composed of a single chip of LSI. As illustrated in FIG. 1, this communication control part 20 is a so-called one-chip microcomputer mainly composed of a CPU 30, a ROM 32 and a RAM 34. The communication control part 20 is externally connected an external oscillator 22 with a built-in quartz oscillator (crystal resonator) 24 which generates the reference clocks for generating the operation clocks of the CPU 30.

Built in the communication control part 20, in addition to the above, is an input/output part (I/O) 36 for inputting/ outputting signals in conjunction with external units, including a communication interface for exchanging communication data with the data transmitting/receiving part 14 and an input port for inputting the start signals from the start determining part 16. Moreover, built in the communication control part 20 are an oscillation circuit 40 for generating the second clock pulses for measuring elapsed time apart from the reference clocks, a dividing counter 42 for dividing the second clock pulses which downcounts the second clock pulses outputted from the oscillation circuit 40, and a zero comparator 44 for detecting that the count value of the dividing counter 42 has reached zero and then generating interruption signals to the CPU 30. The communication control part also includes a dividing counter 46 for dividing the reference clock pulses which downcounts the reference clock pulses inputted from the external oscillator 22, and a zero comparator 48 for detecting that the count value of the dividing counter 46 has reached zero and generating interruption signals, start signals, to the CPU 30.

Upon the receipt of start signals from the start determining part 16 through the I/O 36, the CPU 30 performs communication processing for the toll collection/reception, i.e., makes data communications with the data transmitting/ receiving part 4 on the ground station side, which has transmitted pilot signals to the CPU 30, through the I/O 36 and the data transmitting/receiving part 14 in accordance with a control program previously stored in the ROM 32. Upon the completion of the series of communication processing, the CPU 30 cuts off the input of the reference clock pulses from the external oscillator 22, stops the operation clocks of its own and enters the sleep state not to make the data communications again with the ground station with which the communication processing has been completed.

The above oscillator 40, the dividing counter 42 and the zero comparator 44 compose the above-described timer circuit that measures the time elapsed after the CPU 30 entered the sleep state. When the time measured has reached a specified sleep time determined based on the count value set at the dividing counter 42, the zero comparator 44 generates interruption signals to resume the input of the reference clocks to the CPU 30 (the resumption of processing operation of the CPU 30). The initial value from which the dividing counter 42 starts the downcount of the second clocks and the start of this downcount are controlled by the CPU 30. Here, the specified sleep time has been set in relation to the maximum time required for the responder-mounted vehicle to exit from the communication area of the corresponding ground station.

The count value of the dividing counter 46 downcounting the reference clocks and the staff of the downcount are also controlled by the CPU 30.

The oscillation circuit 40 includes 3 pieces of inversion elements (inverters) NT1, NT2 and NT3 connected in series. The input end of the first inverter NT1 and the output end of the last inverter NT3 are connected to each other with the series circuit of 2 pieces of resistors R1 and R2. The connection points of these registers R1 and R2 and the input end of the last inverter NT3 are connected to a capacitor C so that the output from the last inverter NT3 can be outputted as the second clocks to the dividing counter 42.

That is, this oscillation circuit 40 is a well known CR oscillation circuit using an inverter (also called "inverter oscillation circuit"). Each part level within a loop formed with the inverters NT1 through NT3 and the resistors R1 and R2 is repetitively inverted at a specified cycle determined by the inverting operation time of the inverters NT1 through NT3 and the delay time of the resistors R1 and R2 and capacitor C. For example, when the output level of the initial inverter NT1 is LOW, the output level of the second inverter NT2 is HIGH, and the output level of the last inverter NT3 is LOW, and the output signals (LOW-level signals) from the last inverter NT3 are delayed by a time constant determined by the respective resistance values and the capacity of the capacitor C and inputted into the first inverter NT. Subsequently the output level of the first inverter NT1 is inverted to HIGH, the output level of the second inverter NT2 is inverted to LOW, and the output level of the last inverter NT3 is inverted to HIGH in this order, and the HIGH-level signals are delayed by the resistors R1 and R2 and the capacitor C, and inputted into the first inverter NT1. Therefore, the outputs from the last inverter NT3, which is also the inversion signals, are outputted as the second clocks to the dividing counter 42.

In the communication control part 20 according to the embodiment constructed as described above, when the start signals are inputted thereinto from the start determining part 16, the CPU 30 performs communication processing for the toll collection/reception. When the series of communication processing is completed, the CPU 30 stops the operation clocks of its own, and enters the sleep state. When the CPU 30 enters the sleep state, the timer circuit composed of the oscillation circuit 40, the dividing counter 42 and the zero comparator 44 measures the time elapsed. When the specified sleep time has elapsed, the timer circuit outputs the interruption signals to the CPU 30 to reactivate the CPU 30. As the oscillation circuit 40 used for measuring the sleep time is composed of a CR oscillation circuit using an inverter as described above, there is no need to externally add the oscillation circuit 40 to the communication control part 20 unlike an oscillating unit using an oscillator made of quartz, ceramic or the like, but can be built into the communication control part (LSI) 20 together with the CPU 30, etc.

However, the precision of the oscillation frequency of the oscillation circuit 40 (the frequency of the second clock pulses in other words) is determined by the characteristics (particularly, temperature characteristic) of each element composing the oscillation circuit 40 and largely varies by the operational conditions, such as ambient temperature and power voltage. Therefore, if the operational conditions are subject to quick change, like those of vehicles, the sleep time may vary widely resulting in error. For example, although the CPU 30 has entered the sleep state after the completion of the communication processing, it is likely that after reactivation, the CPU 30 may perform the communication processing again with the ground station that has already completed the communications for the toll collection/reception due to the error in measuring the sleep time.

Figure 3:
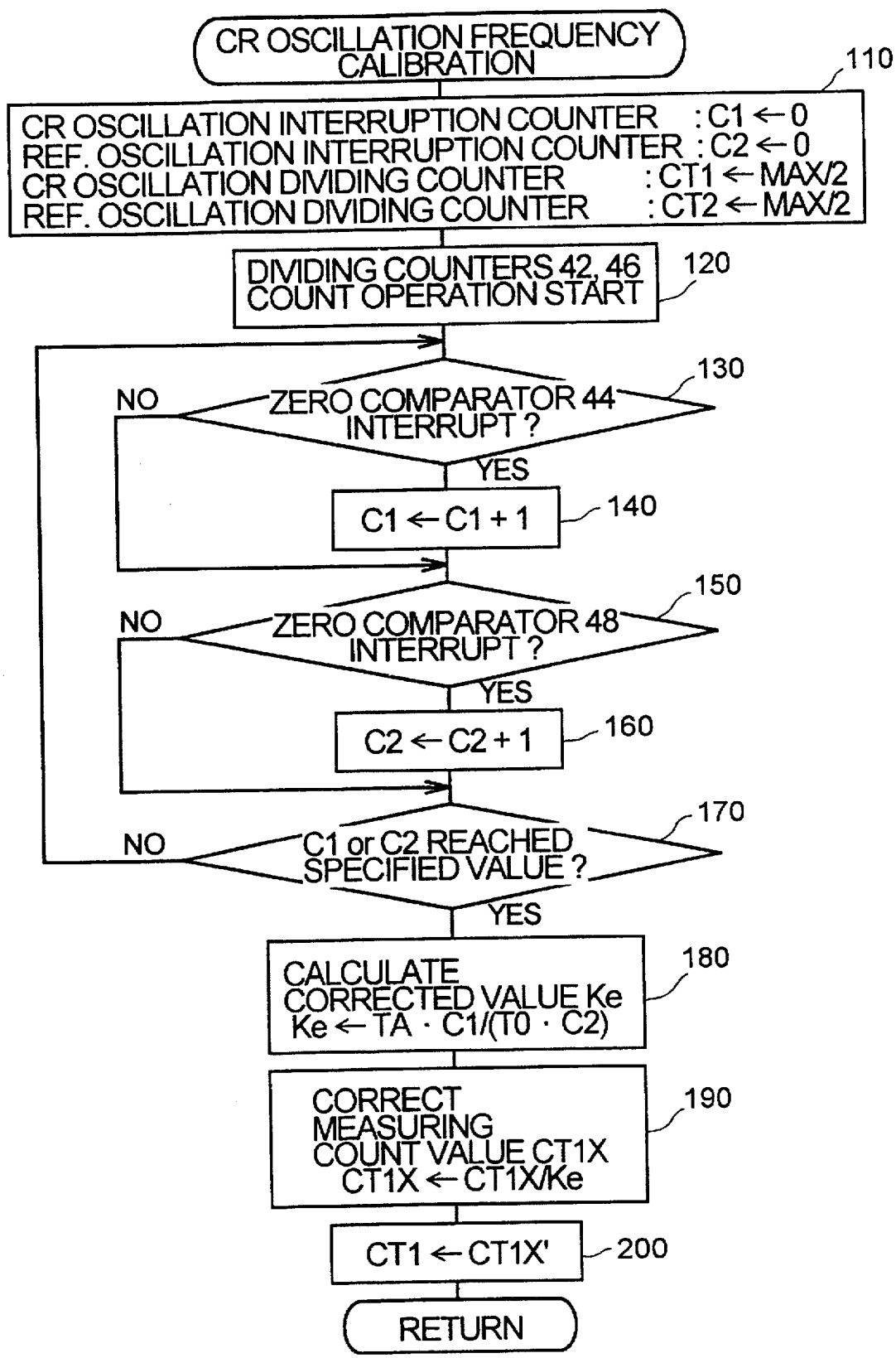
FIG. 3 is a flow chaff illustrating an example of CR oscillation frequency calibration processing to be performed by a CPU according to the present invention.

To solve this problem, the CR oscillation frequency calibration processing is performed as illustrated in FIG. 3 after the completion of the communication processing for the toll collection/reception and before entering the sleep state to precisely set the sleep time.

Hereinafter, the CR oscillation frequency calibration processing will be described.

In the step 110 of the CR oscillation frequency calibration processing illustrated in FIG. 3, the initial value "0" is set to the interruption counter value C1 for the CR oscillation and the interruption counter value C2 for the reference oscillation. Both are set within the specified areas of the RAM 34 to measure the number of interruptions from the zero comparators 44 and 48 in the subsequent processings. The initial values are set to the count values CT1 and CT2 of the respective dividing counters 42 and 46 (MAX/2 in this embodiment, which is the half of the maximum count value MAX of each counter). In the following step 120, the count operations of the respective counters 42 and 46 are started. As a result, the count values CT1 and CT2 of the respective dividing counters 42 and 46 become zero when the number of inputs of the second clock pulses or reference clock pulses has reached the initial value "MAX/2," and at this moment, the zero comparators 44 and 48 output the respective interruption signals.

In the step 130, whether or not the interruption signals have been inputted from the zero comparator 44 is determined. If it is determined that the interruption signals have not been inputted from the zero comparator 44, the process proceeds to the step 150 without performing any further processing. If it is determined, however, that the interruption signals have been inputted from the zero comparator 44, the process proceeds to the step 140, and the counter value C1 of the interruption counter for CR oscillation is incremented according to the interruption signals and the initial value "MAX/2" is set again to the dividing counter 42, and then the process proceeds to the step 150.

In the step 150, whether or not the interruption signals have been inputted from the zero comparator 48 is determined. If it is determined that the interruption signals have not been inputted from the zero comparator 48, the process proceeds to the step 170 without performing any further processing. If it is determined, however, that the interruption signals have been inputted from the zero comparator 48, the value C2 of the interruption counter for reference oscillation is incremented according to the interruption signals and the initial value "MAX/2" is set again to the dividing counter 46, and then the process proceeds to the step 170.

In the step 170, whether or not either of the interruption counter values C1 and C2 incremented in the step 140 or 160 has reached the preset specified value is determined. If it is determined that either of the interruption counter values C1 and C2 has not been overflown, the process returns to the step 130 again, and the processings of the above steps 130 through 160 are performed. If it is determined, however, that either of the interruption counter values C1 and C2 has reached the specified value, the process proceeds to the step 180. Here, the larger the specified value is, the more precisely the error can be calculated.

In sum, in the steps 130 through 170, by setting the initial value "MAX/2" to the respective dividing counters 42 and 46, the zero comparators 44 and 48 are made to generate the interruption signals every specified times TA (=Ta·MAX/2) and TO (=To·MAX/2) determined by the initial value "MAX/2" of the zero comparators 44 and 48 and the second clock period Ta or reference clock period To. Then, the number of interruption signals generated is counted by using the respective interruption counters until either of the counter values C1 and C2 reach the specified value.

In the step 180, from the respective counter values C1 and C2 that have counted the number of the interruption signals from the respective zero comparators 44 and 48 and the respective interruption signal generation periods TA and TO, and by using the following equation (1), the error contained in the setting value of the second clock period Ta is calculated as the correction value K2.

$$Ke = TA \cdot C1/(TO \cdot C2) \tag{1}$$

To be more specific, from the reference clock period To, the count value "MAX/2" set to the dividing counter 46, and the counter value C2 of the interruption counter for reference oscillation, the precise time elapsed from the start of the count operations of the respective dividing counters 42 and 46 to the overflow of either of the interruption counters (To C2) is obtained. Then, by dividing the value obtained by the elapsed time obtained from the second clock period Ta, the count value "MAX/2" set to the dividing counter 42, and the value C1 of the interruption counter for CR oscillation (TA C1), the deviation (in percentage) from the setting value of the second clock period Ta is obtained.

In the subsequent step 190, the count value CT1X of the dividing counter 42 previously set for measuring the sleep time is divided by the correction value Ke expressing the period error of the second clock pulses obtained in the above (i.e., calculating CT1X/Ke) to correct the count value CT1X. Then, the corrected value CT1X' is set to the dividing counter 42, and then, the whole processing terminates.

As described in the above, the communication control part 20 of the responder mounted on the vehicle is composed of the LSI with the built-in CPU 30 having the sleep function. By measuring the sleep time by using the oscillation signals (second clock pulses) from the oscillation circuit 40 formed within the LSI, the power consumption of the communication control part 20 when the CPU 30 is in the sleep state is reduced. Furthermore, immediately before the CPU 30 enters the sleep state, the error Ke with respect to the value set to the oscillation frequency (period) of the oscillation circuit 40 is obtained by using the processing operation of the CPU 30 (CR oscillation frequency calibration processing), and thereby the count value CT1X of the dividing counter 42 that measures the sleep time is corrected.

Therefore, according to this embodiment, the sleep time of the CPU 30 from the time when the responder completes the communications with the ground station to the time when the communication between the responder and the ground station becomes possible again can be measured extremely precisely with precision as high as that of a case where the reference clock pulses are used. Accordingly, there is no possibility that the communication control part 20 starting the communication for the toll collection/reception again due to the start signals from the start determining part 16 after the responder (i.e., vehicle) completed the communication with the ground station for the toll collection/reception and before the responder exits the communication area of the ground station, which takes time due to traffic congestion or the like. As a result, the duplicated charging, which has been a problem with the conventional toll road charging system, can be prevented.

Particularly, according to this embodiment, as the period error Ke of the second clock pulses and the correct the count value CT1X of the sleep time measurement are obtained immediately before entering the sleep state in the processing by the CPU 30 to correct the count value CT1X for sleep time measurement, there is no need to provide a circuit designed exclusively for calculating the second clock period error and correcting the sleep time measurement count value. Therefore, the circuit construction of the communication control part 20 can be simplified, and the count value can be corrected with the period error that is the nearest to the second clock period after entering the sleep state. In other words, by setting the sleep time calibration time to immediately before entering the sleep state, a large variance of the second clock period between the calibration time and the time after entering the sleep state can be minimized, and thereby the accuracy of the sleep time measurement can be improved.

Here, in the CR oscillation frequency calibration processing according to the above embodiment, values equivalent to the ½ of the maximum count values are set respectively to the dividing counter 42 downcounting the second clocks and the dividing counter 46 downcounting the reference clocks. The interruption signals outputted respectively from the zero comparators 44 and 48 whenever the times determined by the count values and the oscillating periods of the respective clocks elapsed are counted. Then, the period error Ke of the second clocks is obtained from the counter values C1 and C2 of the respective interruption signals and the previously set periods Ta and To of the respective clocks. However, in calibrating CR oscillation frequency that the sleep time after the CPU 30 enters the sleep state is precisely measured by the second clock pulses, various other methods may be employed.

Figure 4:
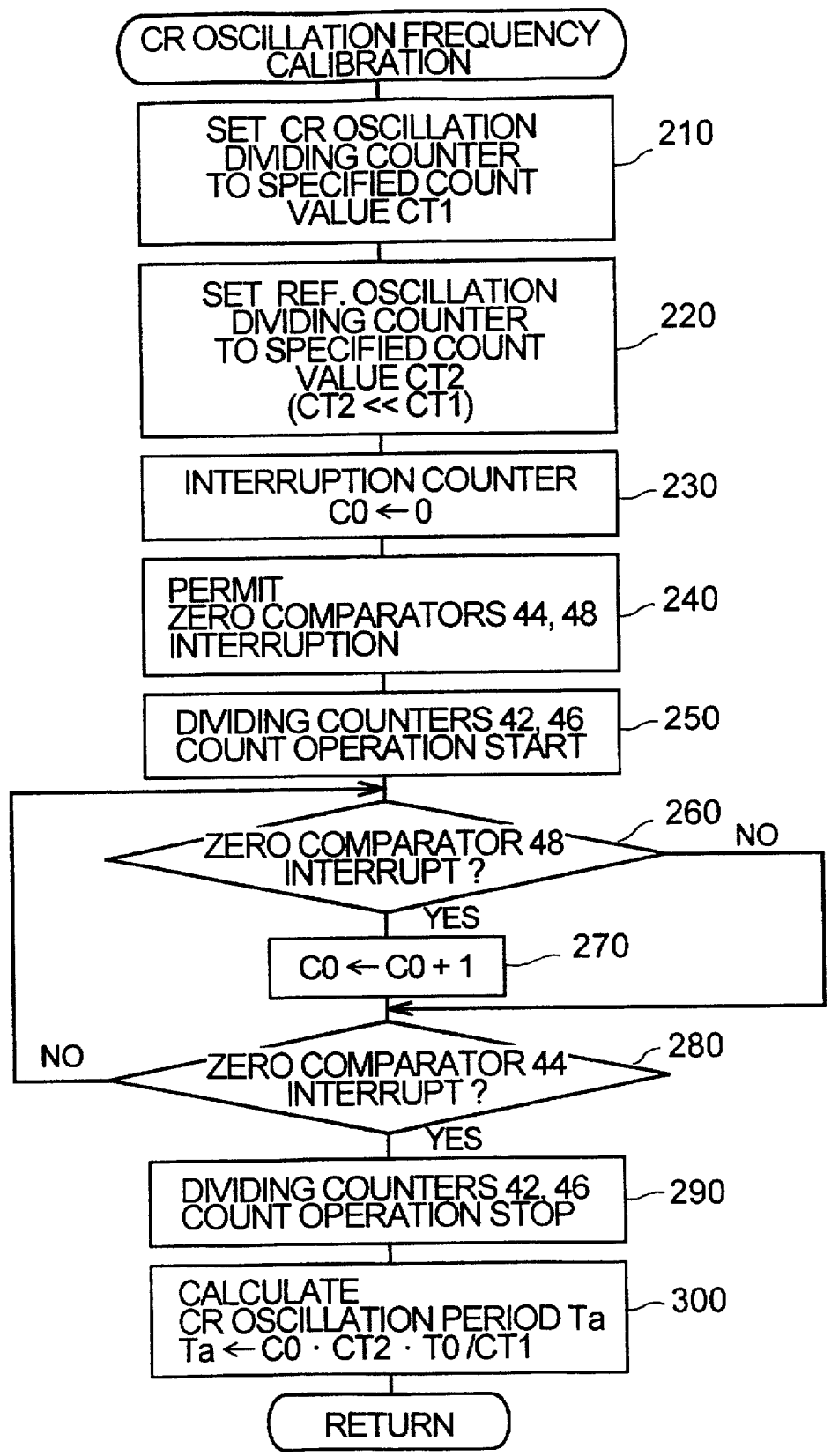
FIG. 4 is a flow chart illustrating another example of the CR oscillation frequency calibration processing to be performed by the CPU according to the present invention.

For example, as illustrated in FIG. 4, a sufficiently large value CT1 (e.g., the maximum count value MAX) could be set to the dividing counter 42 for CR oscillation for counting the second clock pulses, and the sufficiently small value CT1 is set to the dividing counter 46 for reference oscillation for counting the reference clock pulses (steps 210 and 220). Only the interruption counter for counting the interruption signals outputted from the zero comparator 48 on the reference clock side is set as an interruption counter, and the count value C0 of this interruption counter is initially set to "0" (step 230). Next the interruption signals from each comparator is permitted (step 240); then, the count operations of the respective dividing counters 42 and 46 are starts (step 250). The number of interruption signals inputted from the zero comparator 48 on the reference clock side until the interruption signals are inputted from the zero comparator 44 on the second clock side is counted by using the interruption counter (steps 260 through 280). When the interruption signals are inputted from the zero comparator 44, the count operations of the respective dividing counter 42 and 46 are stopped (step 290). The oscillation period of the oscillation circuit 40 (i.e., the period of the second clocks) Ta is directly obtained from the count value C0 of the interruption counter, the count values CT1 and CT2 set to the respective dividing counters 42 and 46, and the period To of the reference clocks, and by using the following equation (2):

$$Ta = C0 \cdot CT2 \cdot To / CT1 \qquad (2)$$

In this case, the count value to be set to the dividing counter 42 for measuring the sleep time can easily be obtained by dividing the previously set sleep time by the oscillation period Ta of the oscillation circuit 40 obtained by using the equation (2). If this value is set to the dividing counter 42 and have the CPU 30 enter the sleep state, the operation of the CPU 30 can be resumed after the elapse of the desired sleep time.

Furthermore, in the above embodiments, descriptions have been given to examples in which the count value for measuring the sleep time is corrected (or obtained) by obtaining the period error Ke of the second clock pulses from the oscillation circuit 40 or by obtaining the period Ta itself referring to the period of the reference clock pulses from the external oscillation unit 22. However, this embodiment may also be applied to a structure in which, for example, a command for instructing the start and stop of the time measurement by using the timer circuit is transmitted to the dividing counter 42 from the ground station side at a specified time interval, the timer circuit is operated according to the received command within the communication control part 20, and the period Ta of the second clocks is calculated from the count value of the second clocks in the operation period.

Figure 5:
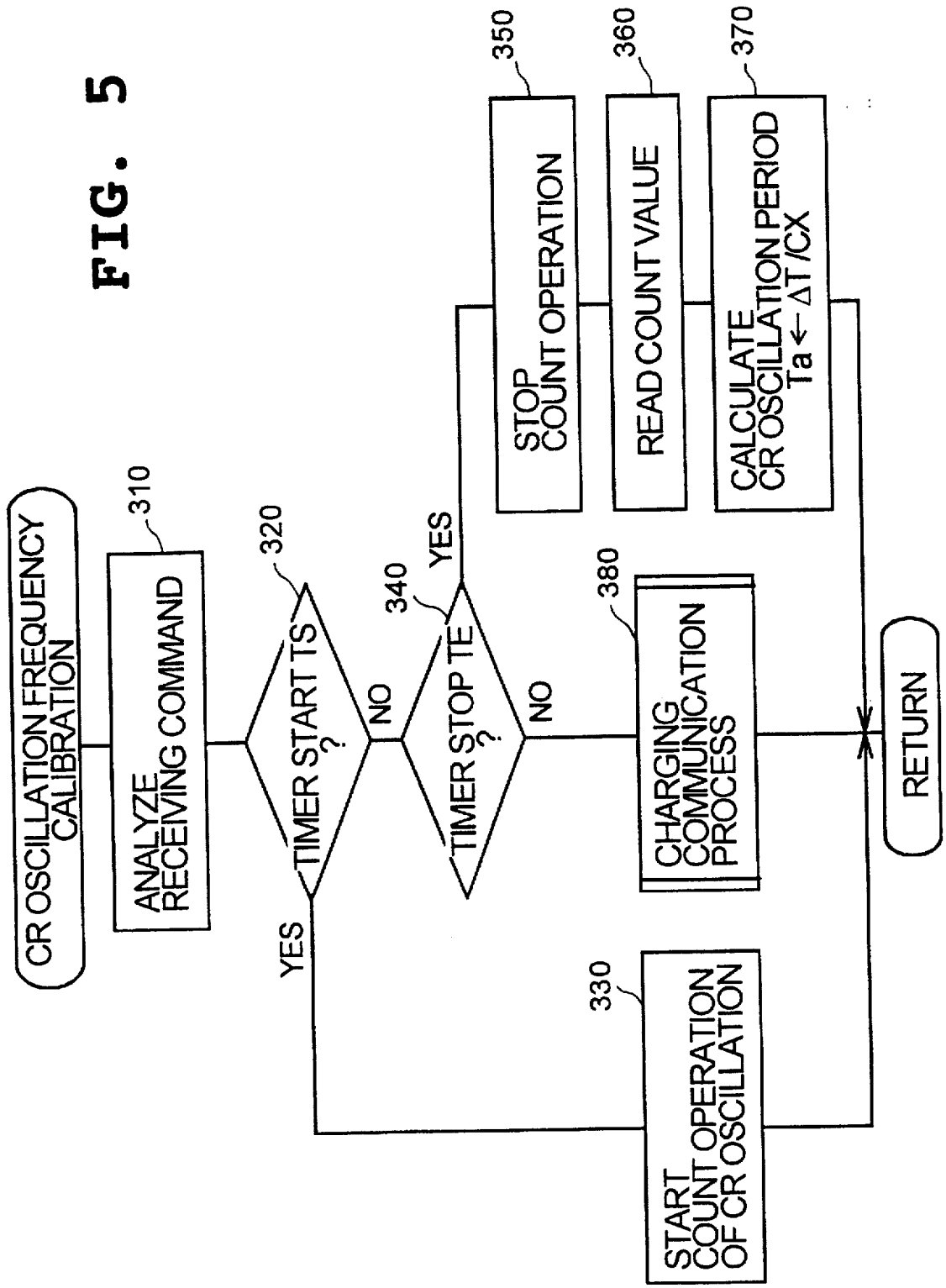
FIG. 5 is a flow chart illustrating an example of the CR oscillation frequency calibration processing to be performed by the CPU without using the reference clock pulses from an oscillator.

In another exemplary embodiment, in the CPU 30, as illustrated in FIG. 5, the command transmitted from the ground station side is analyzed based on the received signals inputted through the data transmitting/receiving part 14 (step 310). If the received command is found to be a command "TS" instructing the timer start (step 320:YES), the count operation of the dividing counter 42 is started (step 330); and if the received command is found to be a command "TE" instructing the timer stop (step 340:YES), the count operation of the dividing counter 42 is stopped (step 350); if the received command is found to be not the command instructing the start or stop of the timer (steps 320 and 340:NO), the communication processing for ordinary charging is performed. After stopping the count operation of the dividing counter 42 under the time stop command "TE," the count value of the second clocks counted by the dividing counter 42 during the time from the timer start to the timer stop is read (step 360); and the oscillation period of the oscillation circuit 40, i.e., the second clock period Ta is obtained from the read count value CX and the time ΔT from the previously set timer start to timer stop (Ta=ΔT/CX).

In the arrangement described above, there is no need to use the reference clock pulses for calibrating the oscillation frequency of the oscillation circuit 40, and also there is no need to form the dividing counter 46 and the zero comparator 48 within the communication control part 20 for generating the reference time from the reference clocks for use in calibration. As a result, the calibration of the communication control part 20 can further be simplified.

Furthermore, in the above embodiment, the CPU 30 is so constructed as to resume the processing operation after the elapse of the specified sleep time. However, the CPU 30 may also be so constructed as to simply become ready for resuming the processing operation after the elapse of the specified sleep time. In the state ready for resuming the processing operation, the CPU 30 may only resume the processing operation when the start determining part 16 determines the pilot signals received through the antenna 12 to be equivalent to or higher than the specified level.

Figure 6:
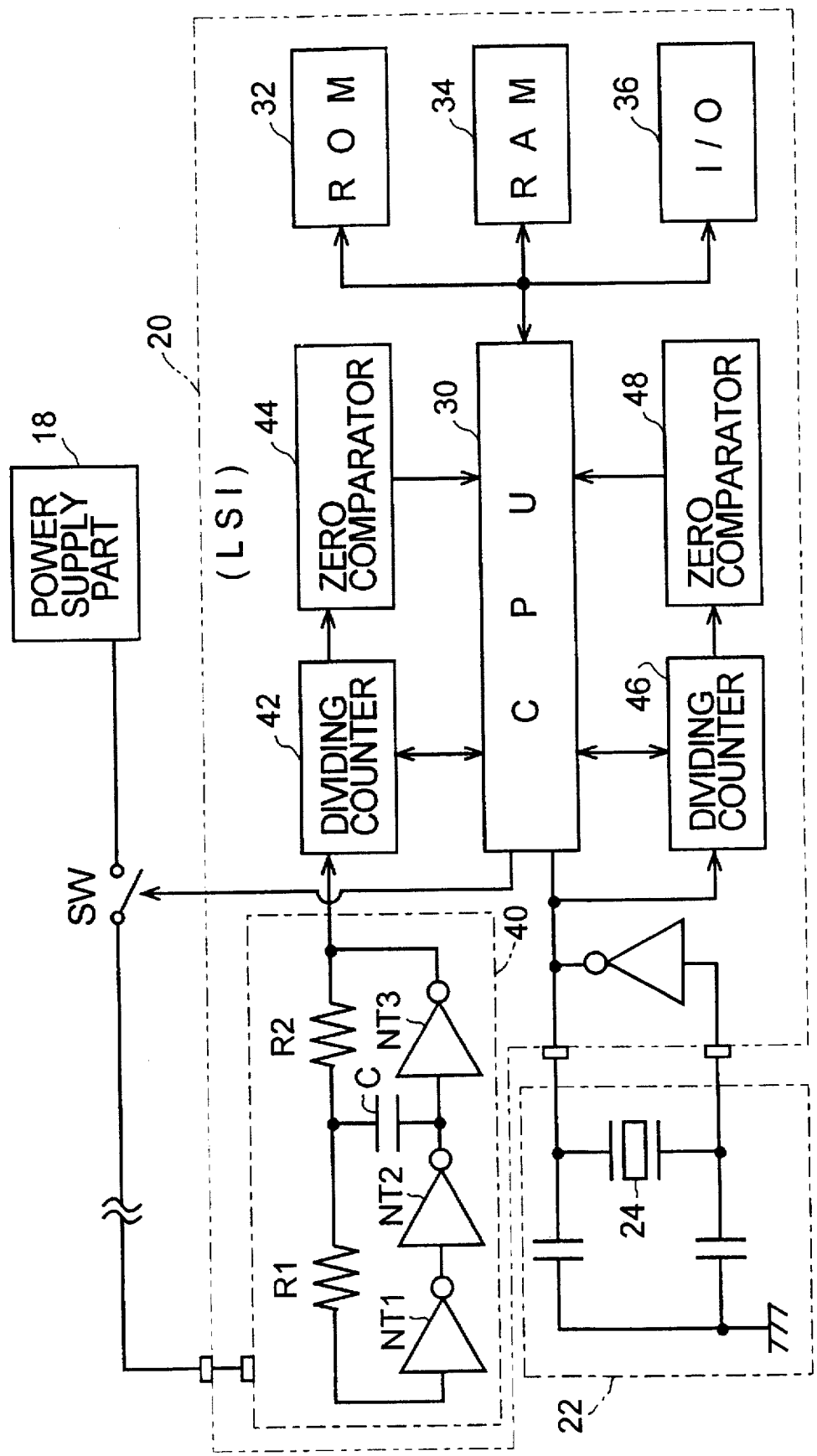
FIG. 6 is an electric circuit diagram illustrating the composition of a communication control part of another embodiment according to the present invention.

Moreover, the oscillation circuit 40 may also be so constructed as to be supplied with electric power only when the communication processing for toll collection/reception has been completed, i.e., when the CR oscillation frequency is under the calibration processing, and when the sleep time is in measurement. To be more specific, as illustrated in FIG. 6, when completing the communication for toll collection/reception, the CPU 30 outputs the communication completion signals to the switch SW. The switch SW is turned ON by the application of the communication completion signals to supply electric power to the oscillation start. When switching from the sleep state to the state ready for resuming the processing operation, the CPU 30 outputs the communication enable signals to the switch SW. Receiving the communication enable signals, the switch SW cuts off the power supply route from the power supply part 18 to the oscillation circuit 40. This inactivates the oscillation circuit 40. In this arrangement, the oscillation circuit 40 can operate only when the CR oscillation frequency is in calibration processing and the sleep time is under measurement. As a result, power consumption can be reduced.

In addition, in the above embodiments, the calibration of the sleep time by the calculation of the oscillation period error contained in the second clock pulses is materialized by the processing operation of the CPU 30, and thereby the integrated circuit, i.e., the circuit composition of the responder mounted on the vehicle, is simplified. In this case, even if the oscillation frequency of the oscillator serving as the reference is changed, this change can be complied with by the change of the operation program for calibrating the sleep time of the CPU according to the oscillation frequency of the oscillator. However, in some uses, the calculation processing of the CPU is more frequent, and so much so that the CPU has a heavier processing burden. To counter this problem, for example, the calibration of the sleep time is constructed with a logic circuit as hardware.

In other words, in order to calibrate the sleep time by obtaining the error of the second clock pulses based on the reference clock pulses generated by the quartz oscillator, a special-purpose logic circuit may be composed of, for example, a frequency dividing circuit for dividing the reference clock pulses, a pulse generating circuit for generating pulse signals at every elapse of the specified time obtained by timing the reference clock pulses by the dividing value, a counter for counting the number of the second clock pulses outputted from the oscillation circuit during the time when two pulse signals are outputted from the pulse generating circuit, a dividing circuit for obtaining the frequency error of the second clock pulses with respect to the reference clock pulses by dividing the count value of the counter by the dividing value of the frequency dividing circuit, and a multiplying circuit for multiplying the division result by the dividing circuit by the count value for determining the elapse time of the sleep time.

The above embodiments, is applied to the responder of the toll charging system. However, the present invention may also be applied to any circuit for any use on condition that such circuit is a semiconductor integrated circuit having a built-in CPU with the sleep function which activates the CPU upon the receipt of the reference clock pulses from an external oscillator composed of a quartz oscillator or the like and inactivates the CPU upon the input of the reference clocks by itself when the specified conditions are satisfied.

For example, the timer circuit according to the present invention may be used as a self-diagnosing timer circuit which activates the CPU from the sleep state at a regular time interval and has the CPU 30 self-diagnose the operation thereof.

In addition, the oscillation circuit to be incorporated into a semiconductor IC could be different from the CR oscillation circuit (inverter oscillation circuit) utilizing an inversion circuit (inventer) as described above. The alternate oscillation circuit that does not use any quartz or ceramic oscillator as realized in a general CR oscillation circuit composed of capacitor, resistor and transistor, an inverter oscillation circuit which simply and annually links odd number of inverters for generating the oscillations clocks by utilizing only the inversion operation time of the inverter, or the like and can form all the oscillation circuits within the semiconductor integrated circuit together with the CPU.

Also, as a counter for measuring the sleep time by counting the second clocks outputted from the oscillation circuit, it is possible to use what is called an up-counter instead of a down-counter like the embodiment. In this case, however, a determination circuit for determining whether or not the value of the counter has reached the specified value should be provided instead of the zero comparator of the above embodiment.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor integrated circuit comprising:
   a CPU having a control program which causes said CPU to:
   process data using reference clock pulses from an externally connected oscillator,
   automatically cut off said reference clock pulses to said CPU when a specified condition is satisfied during the performance of said processing so that said CPU enters a sleep state, and
   resume said process by applying said reference clock pulses to said CPU upon receiving a start signal so that said CPU exits said sleep state; and
   a timer circuit, coupled to said CPU comprising:
      an oscillation circuit composed of at least a capacity element, a resistance element and a semiconductor element, said oscillation circuit generating second clock pulses without using an externally connected oscillator; and
      sleep time determining means for counting said second clock pulses from a start count value, and generating said start signal when a count value reaches a specified value;
   wherein said CPU includes sleep time calibrating means for correcting said start count value before said CPU enters said sleep state based on a time error contained in said second clock pulses with respect to said reference clock pulses or reference signals externally inputted at a specified time interval.

2. A semiconductor integrated circuit according to claim 1, wherein said sleep time calibrating means comprises:
   calculating means for counting said second clock pulses upon a receipt of a first reference signal of said reference signals, and for calculating said time error of said second clock pulses based on said count value of said second clock pulses and said specified time interval of said reference signals; and
   correcting means for correcting said start count value based on said time error of said second clock pulses calculated by said calculating means.

3. A semiconductor integrated circuit according to claim 1, wherein:
   said semiconductor integrated circuit is a communication controlling circuit comprising a mobile communication apparatus together with a communication circuit for performing radio communication with a ground station through an antenna and a communication start determining circuit for determining upon a receipt of specified electric waves from said ground station through said antenna that said apparatus has entered an area where communications with said ground station are possible and outputs communication start signals; and
   said CPU performs a specified communication processing, which is transmitting and receiving data to and from said ground station through said communication circuit upon the output of said communication start signals from said communication start determination circuit, and determines that said specified condition for entering said sleep state have been satisfied upon the completion of said communication processing.

4. A semiconductor integrated circuit according to claim 1, further comprising:
   reference time determining means for counting said reference clock pulses and for generating a reference timing signal when said reference time determining means counts a second calibration value of said reference pulses;
   wherein said sleep time calibrating means comprises:
      calculating means for setting said reference time determining means with said second calibration value and said sleep time determining means with a first calibration value, then concurrently operating said reference time determining means and said sleep time determining means, and calculating said time error contained in said second clock pulses based on the number of said reference timing signals and said start signals from said respective determining means; and
      correcting means for correcting said start count value based on said time error of said second clock pulses calculated by said calculating means.

5. A semiconductor integrated circuit according to claim 4 wherein:
   said CPU performs calculations of said calculating means and said correcting means after said specified condition for entering said sleep state has been satisfied, and
   said CPU activates the sleep time determining means of said timer circuit after the completion of said calculations of said calculating means and correcting means, and then enters said sleep state.

6. A communication control apparatus comprising:
   a communication circuit for receiving communication signals through an antenna;
   a CPU, coupled to the communication circuit, for performing processing when the communication signals are received from the communication circuit and for entering a sleep state when a condition has been satisfied upon the completion of the processing; and
   timer means, coupled to the CPU, including a self oscillator comprising a semiconductor element for generating clock pulses without using a crystal oscillator, and measuring a sleep time of the CPU by counting the clock pulses;

the CPU including sleep time calibrating means for correcting a clock count value of the timer means only once by obtaining an error contained in the clock pulses based on reference signals externally inputted at a specified time interval upon the determination that the condition for the CPU for entering the sleep state has been satisfied.

7. A communication control apparatus according to claim 6, wherein the timer means operates only when determining that the condition for the CPU for entering the sleep state has been satisfied.

8. A communication control apparatus according to claim 6, wherein the timer means is supplied with an electric power only when determining that the condition for the CPU for entering the sleep state has been satisfied.

9. A communication control apparatus according to claim 6, wherein:

the communication circuit performs radio communications with a ground station through the antenna and includes a communication start determining circuit for determining upon the receipt of specified electric waves from the ground station through the antenna that the apparatus has entered an area where communications with the ground station are possible and outputting a communication start signal; and the CPU performs the communicating processing, which is transmitting and receiving data to and from the ground station through the communication circuit upon the output of the communication start signal from the communication start determination circuit, and determines that the condition for entering the sleep state has been satisfied upon the completion of the communication processing.

10. A communication control apparatus according to claim 9, wherein the communication control apparatus is applied to a responder of a toll road charging system.

11. A communication control apparatus according to claim 6, wherein the CPU performs the processing according to a control program using reference clock pulses from an externally connected oscillator and enters the sleep state by cutting off the reference clock pulses to the CPU.

12. A communication apparatus according to claim 11, wherein the reference signals externally inputted at the specified time interval are the reference clock pulses from the externally connected oscillator.

13. A communication control apparatus according to claim 1, wherein the sleep time calibrating means comprises:

calculating means for counting the clock pulses by the timer means from the receipt of a first reference signal of said reference signals, and for calculating a correction coefficient based on the counted clock pulses by the timer means and a time interval from a timing of the first reference signal to a timing of the subsequent reference signal; and correcting means for correcting the clock count value for use in the determination of the sleep time by the timer means based on the correction coefficient calculated by the calculating means.

14. A communication control apparatus according to claim 1, wherein the CPU enters a resumption enable state when the sleep time counted by the timer means reaches a specified time and resumes the processing operation in the resumption enable state when the communication circuit receives the communication signals.

15. A communication control apparatus according to claim 14, wherein the CPU resumes the proceeding operation when a signal level of the communication signals received by the communication circuit becomes equivalent to or higher then a specified signal level.

16. A communication control apparatus according to claim 1, further comprising:

reference time determining means for counting the reference clock pulses, and determining when a reference count value of the reference clock pulses reaches a reference calibration value;

wherein the sleep time calibrating means comprises:

calculating means for counting the clock pulses generated by the timer means to determine when the clock count value reaches a clock calibration value, and calculating a correction coefficient based on the relationship between when the reference count value reached the reference calibration value and when the clock count value reached the clock calibration value; and correcting means for correcting the clock count value for use in the determination of the sleep time by the timer means based on the correction coefficient calculated by the calculating means.

17. A communication control apparatus according to claim 16, wherein:

the CPU performs calculation processing operations of the calculating means and the correcting means after the condition for entering the sleep state has been satisfied, and the CPU starts the counting of the sleep time by the timer means after the completion of the calculation processing operations, and then enters the sleep state.

18. A communication control apparatus according to claim 16, wherein the reference time determining means is a down-counter.

* * * * *